United States Patent [19]

Fiore et al.

[11] Patent Number: 4,503,190

[45] Date of Patent: Mar. 5, 1985

[54] PROCESS FOR THE PREPARATION OF MIXES OF ACRYLIC RUBBERS WITH STYRENE/ACRYLONITRILE COPOLYMERS, ENDOWED WITH IMPROVED IMPACT-RESISTANT CHARACTERISTICS

[75] Inventors: Leonardo Fiore; Marco Binaghi; Ugo Bonicelli, all of Milan, Italy

[73] Assignee: Montedison S.p.A., Milan, Italy

[21] Appl. No.: 499,525

[22] Filed: May 31, 1983

[30] Foreign Application Priority Data

Jun. 1, 1982 [IT] Italy ................................ 21619 A/82

[51] Int. Cl.$^3$ .............................................. C08L 63/02
[52] U.S. Cl. ...................................... 525/108; 525/119
[58] Field of Search ........................................ 525/108

[56] References Cited

U.S. PATENT DOCUMENTS 3,183,281  5/1965  Clemens ............................... 525/108
3,249,564  5/1966  Haskell ................................. 525/108

FOREIGN PATENT DOCUMENTS 941732  11/1963  United Kingdom ................. 525/108

*Primary Examiner*—John C. Bleutge
*Assistant Examiner*—Robert E. L. Sellers, II

[57] ABSTRACT

The impact-resistance characteristics of styrene/acrylonitrile copolymers (SAN) are improved by the admixture to them of acrylic rubbers consisting of either copolymers or terpolymers of ethyl and/or butyl acrylate with acrylic and/or methacrylic acid, by carrying out said mixing in the presence of from 0.05 to 2% by weight of a halide chosen out from among: $ZnCl_2$, $FeCl_3$, $AlCl_3$, $CdCl_2$, $BF_3.(C_2H_5)_2O$; and of 0.5–5 mols, on 100 mols of acrylic rubber, of an epoxy cross-linking compound, at temperatures comprised between the glass transition temperature of the SAN copolymer and 220° C.

2 Claims, No Drawings

PROCESS FOR THE PREPARATION OF MIXES OF ACRYLIC RUBBERS WITH STYRENE/ACRYLONITRILE COPOLYMERS, ENDOWED WITH IMPROVED IMPACT-RESISTANT CHARACTERISTICS

BACKGROUND OF THE INVENTION

It is quite known that an improvement of the impact resistance properties of a relatively fragile (brittle) thermoplastic material such as styrene/acrylonitrile copolymer (SAN), may be obtained by the addition to the SAN of a gummy polymer with a sufficiently high degree of chemical/physical compatibility with SAN.

As a rule, the compatibility of the rubber with SAN is achieved by grafting onto the rubber segments of styrene/acrylonitrile copolymer. The rubbers used for such a grafting may be of different types. Those normally used are: polybutadiene, ethyl- and/or butyl polyacrylate, the ethylene/propylene/diene terpolymers. The graft on the rubber may be carried out in various different ways. Thus, for instance, one may operate on the rubber in: emulsion, suspension or in solution, by the addition of a radical catalyst and of a mix or blend of styrene or acrylonitrile monomers. At any rate, the modification of the rubber requires a special set up in which to start the grafting. The grafted rubber must then undergo some processes of separation from the residual monomers, of purification and drying before they may be admixed to the SAN in the desired ratios.

The rigid matrix SAN, in general is synthetized separately. In some instances said matrix may be prepared in the same reactor in which is carried out the grafting of the rubber. In this case the process is however made even more complicated by the higher number of variables to be controlled.

THE PRESENT INVENTION

We have now found that it is possible to make particular types of acrylic rubber compatible with SAN, that is, to obtain an improvement of the impact-resistance characteristics of the SAN by the addition of said acrylic rubbers, carrying out the mixing together of the two products, in the presence of particular compounds of the Lewis acid type.

It is thus possible to eliminate the whole of the preparatory stage of the grafted rubber and to conduct the reaction on the conventional standard machines used for the mixing of SAN with the rubber, and for the successive operation, with an evident economical advantage, derived from the lower investments required for the equipment and for the simplification of the unitary operations of the process. The use of acrylic rubber in the blend imparts to it also advantageous weather-proof characteristics, thanks to the unsaturations in the gummy stage. Said unsaturation, present in other rubbers, in fact represents a preferential point of attack for the thermo- and photo-oxidation reactions.

The Lewis acid used for the purpose is a halide of the types: $ZnCl_2$; $FeCl_3$, $AlCl_3$, $BF_3 \cdot (C_2H_5)_2O$, $CdCl_2$. Said halide is used in quantities comprised between 0.05% and 2% by weight on the total weight of the polymeric blend.

Zinc chloride is preferred, better still if in quantities comprised between 0.1% and 1% on said mix or blend.

The acrylic rubber suited for the purposes of the present invention must possess particular characteristics of cross-linking, such that will make it possible to achieve with one single catalyst and in one single operation the grafting and cross-linking reactions.

Typical examples of rubbers suited for the purpose are either copolymers consisting for 95–99.5% in mols of an ethyl- or butyl-acrylate and for 5–0.5% in mols of an acrylic and/or methacrylic acid, or terpolymers formed for 95–99.5% in mols by a mixture of ethyl- and butyl-acrylate and for 5–0.5% in mols of acrylic and/or methacrylic acid. For the purposes of this invention, said copolymers or terpolymers must be used in the presence of a cross-linking agent of the epoxy type, that may be used in a mixture or in the form of a product chemically bound to the chain of the macromolecule of said copolymers or terpolymers. Said epoxidic agent must have at least two epoxy functions when used in admixture with acrylic rubber, while it may, but must not necessarily, be monofunctional when it is present as a product chemically bound to the said rubber.

Preferably, said epoxy agent or compound is used in quantities comprised between 0.5 and 5 mols on 100 mols of acrylic rubber, or, in the case that it is chemically bound to the rubber, on 100 mols of the total of monomeric units consisting of ethyl and/or butyl acrylate and acrylic and/or methacrylic acid.

Examples for such epoxy-compounds that may be used in admixture with acrylic rubber are diglycidylether of bis-phenol A, ethylenglycoldiglycidylether, and in general all the diepoxy, polyepoxy compounds, and all the epoxy resins having such a molecular weight as to be compatible or miscible with acrylic rubber. As epoxidic cross-linking agents chemically bound to the macromolecule of acrylic rubber, there may be cited as an example the glycidylether acrylates.

The blend of acrylic rubber with SAN may be carried out at a temperature comprised between the glass transition temperature of SAN (about 140° C.) and about 220° C. In the usual practice it is operated at temperatures comprised between 160° C. and 220° C.

Thus, object of the present invention is that of providing a process for the preparation of acrylic rubber blends or mixes consisting of copolymers of ethylacrylate and/or butylacrylate with acrylic and/or methacrylic acid with styrene/acrylonitrile copolymers, which process consists in mixing together said acrylic rubber with such acrylonitrile/styrene copolymers, at temperatures comprised between the glass transition temperature of the acrylonitrile/styrene copolymer and 220° C., in the presence of from 0.05 to 2% by weight with respect to the acrylic rubber mix with said copolymers, of a compound chosen out from amongst zinc chloride, ferric chloride, cadmium chloride, boron trifluoride and aluminum chloride, as well as of an epoxidic cross-linking agent.

The quantity of acrylic rubber to be admixed to the SAN in the process of the present invention, may vary within a wide range,—for instance, between 5% and 50%, but preferably comprised between 10% and 30% by weight on the weight of the blend with SAN, depending on the degree of reinforcement desired.

The SAN used for the purpose is preferably formed for 25–35% in mols of acrylonitrile and for 75–65% of styrene.

The blending or mixing may be carried out on conventional (standard) equipment for the processing of polymers, such as for instance Banbury mills, extruders, cylinder mixers etc. The operational conditions vary with the type of machine used.

The increase in impact-resistance of the blend made compatible according to the present invention, with respect and in comparison to the impact-resistance of a simple mechanical blend, is considerable and may even attain 400%.

The following examples are given for further illustrating the inventive idea of this invention, but in no way should be considered limitative of the scope of the invention itself.

In the evaluation of the impact-resistance characteristics of the materials obtained according to the procedures described in the examples that follow, there was used the ASTM D 256 Method B Test (Charpy test) on test pieces or specimens ⅛" thick and with a notch or indent, obtained by a mechanical process from small plates of the same thickness, obtained by compression molding.

The elasticity coefficient or modulus under bending was determined through the "bounce-test" on specimens identical with those of the Charpy test, but without a notch. The measurement was carried out on a pendulum instrumented for Charpy-tests, with an impact velocity of 10 cm/sec. The flexural modulus or coefficient was calculated from the time of contact of the testing hammer with the specimen, through the formula:

$$E = \frac{\pi^2}{t°^2} \frac{Ml^3}{48 I}$$

E = elasticity modulus
t° = time of contact
M = effective mass of hammer
I = moment of inertia
l = distance between the supports of the specimen.

The characteristics of the SAN used in the following examples, have been recorded on Table 1. (The trade names of: Kostil AF, Kostil AM and Kostil AP refer to styrene/acrylonitrile copolymers produced by Montedison S.p.A.)).

TABLE 1

| Name of product | Content in acrylonitrile (% mols) | Intrinsic viscosity in Tetrahydrofurane at 30° C. (ml/g) | Mean numerical molecular weight |
|---|---|---|---|
| KOSTIL AF | 28 | 84 | 70,000 |
| KOSTIL AM | 25 | 78 | 62,000 |
| KOSTIL AP | 27 | 65 | 53,000 |

The characteristics of acrylic rubbers (Elaprim AR 152 and AR 153), used in the following examples are just indicated hereunder. (The trade names: Elaprim AR 153 and Elaprim AR 152 refer to acrylic rubbers produced by Montedison S.p.A.).

Elaprim AR 153: blend formed of 100 parts by weight of copolymer of ethylacrylate (99% by weight) and acrylic acid (1% by weight), with 3 parts by weight of diglycidylether of bis-phenol A. Said mix or blend shows a Mooney viscosity at 100° C. of 48.

Elaprim AR 152: blend formed of 100 parts by weight of terpolymer of ethylacrylate (64% by weight)/butylacrylate (35% by weight) and acrylic acid (1% by weight), with 3 parts by weight of diglycidylether of bisphenol A. Said blend shows a Mooney viscosity at 100° C. of 37.

On Table 2 have been recorded the resiliency coefficients and the elasticity modulus of the products according to examples from 1 to 4.

EXAMPLE 1

15 grams of Elaprim AR 153 rubber and 35 g of SAN copolymer (Kostil AP) were mixed together in a Brabender mill running at 100 r.p.m. and having the mixer barrel pre-heated by oil circulation at 170° C.

After 2 minutes there were added 0.15 grams of anhydrous zinc chloride, and mixing was then kept on for further 10 minutes. At the end of the mixer, the temperature of the mix or blend amounted to about 220° C. The polymeric mass was thereupon extracted from the mixing mill and compression molded. A portion of the blend was then finely comminuted and extracted in an extractor with boiling acetone, in order to separate the gummy part of SAN that had not reacted.

The elementary analysis of the part insoluble in acetone showed a content in nitrogen of 1.1%, corresponding to a percentage of acrylonitrile bound to the rubber of about 4.1%.

EXAMPLE 2

(for comparative purposes)

It was operated in the same way as in example 1, but omitting the addition of the zinc chloride. The end or final temperature of the blend amounted to about 200° C.

EXAMPLE 3

(for comparative purposes)

The same procedures were followed as in example 1, but using instead of Elaprim AR 153 rubber, an ethyl acrylate/acryl acid copolymer containing 1% in mols of acrylic acid, (thus operating in the absence of cross-linking epoxy).

EXAMPLE 4

Example 3 was repeated, but adding to the blend 0.45 grams of diglycidylether of bisphenol A.

TABLE 2

| Example N° | Charpy resiliency (Kg · cm/cm$^2$) | Elasticity modulus under bending (Kg/cm$^2$) |
|---|---|---|
| 1 | 14.66 | 19,500 |
| 2 | 6.6 | 18,900 |
| 3 | 6.8 | 19,600 |
| 4 | 17.5 | 19,700 |

EXAMPLE 5

Into a Bambury mixer of 1300 cc holding capacity, were introduced 910 grams of Kostil AP and 390 g of Elaprim AR 153. After 5 minutes of mixing through, to the mix were added 4 g of anhydrous zinc chloride. Thereupon mixing was continued at 210° C. for 10 minutes, after which the molten mass was discharged from the Bambury and allowed to cool down. At last it was ground in mill. From the ground material there were obtained by compression molding test pieces or specimens to be used for the measurement of the elasticity modulus and the resiliency coefficient.

EXAMPLE 6

Example 5 was repeated, but using 975 grams of Kostil AP and 325 grams of Elaprim AR 153.

EXAMPLE 7

Example 5 was repeated, but this time using 1040 grams of Kostil AP and 260 grams of Elaprim AR 153.

EXAMPLE 8

Example 5 was repeated, but using 910 grams of Kostil AP and 390 grams of Elaprim AR 152 rubber.

EXAMPLE 9

(comparison)

Example 8 was repeated, however leaving out the addition of zinc chloride.

EXAMPLE 10

Example 5 was repeated, but instead of zinc chloride there were used 0.4 grams of anhydrous cadmium chloride.

EXAMPLE 11

Example 5 was repeated, using instead of zinc chloride, 0.4 g of anhydrous ferric chloride.

On Table 3 have been recorded the resiliency values and the elasticity modulus found in the products obtained in examples from 5 to 11.

TABLE 3

| Example N° | Charpy resiliency (Kg · cm/cm$^2$) | Elasticity modulus under bending (Kg/cm$^2$) |
| --- | --- | --- |
| 5 | 17.1 | 19,500 |
| 6 | 13.4 | 20,900 |
| 7 | 8 | 26,100 |
| 8 | 16.7 | 19,200 |
| 9 | 5.8 | 27,400 |
| 10 | 6.2 | 19,600 |
| 11 | 10.1 | 17,600 |

EXAMPLE 12

15 grams of Elaprim AR 153 rubber and 35 grams of KOSTIL AP were mixed together in a Btabender at 60 rev.p.min. and with the barrel pre-heated to 170° C.

After 1 Minute there were added 0.15 grams of anhydrous zinc chloride and the mixing was carried on for another 5 minutes. At the end of the mixing, the temperature of the mix amounted to about 210° C. The polymeric blend was removed from the mixer and was compression molded to ⅛" thickplates that were used for measuring the resiliency values and the elasticity modulus.

EXAMPLE 13

It was operated as in example 12, but using 35 g of Kostil AM instead of Kostil AP.

EXAMPLE 14

The same procedures as in example 12 were followed, but using 35 grams of Kostil AF instead of Kostil AP.

The resiliency values and the elasticity modulus of the products obtained according to examples from 12 to 14 have been recorded on Table 4.

TABLE 4

| Example N° | Charpy resiliency (Kg · cm/cm$^2$) | Elasticity modulus under bending (Kg/cm$^2$) |
| --- | --- | --- |
| 12 | 12.6 | 21,000 |
| 13 | 22.8 | 21,100 |
| 14 | 17.9 | 21,500 |

EXAMPLE 15

91 grams of Kostil AP, 39 g of Elaprim AR 153, 0.4 g of anhydrous zinc chloride were mixed together in a cylinder mixer (cylinder mill) pre-heated to 170° C. After 20 minutes of mixing, the blend was discharged from the mixer and compression molded into plates ⅛" thick. The charpy resiliency of the material tested, turned out to be equal to 9.1 Kg.cm/cm$^2$ while the elasticity modulus under bending proved to be 17,500 Kg/cm$^2$.

EXAMPLE 16

It was operated like in example 1, using instead of Elaprim AR 153 rubber, a copolymer consisting of 98.5% by weight of ethylacrylate, of 0.5% by weight of acrylic acid and 1% by weight of glycidylmethacrylate. The Charpy resiliency of the product proved to be 16.8 Kg.cm/cm$^2$, while the elasticity modulus under bending amounted to 19,200 Kg/cm$^2$.

What we claim is:

1. Process for preparing acrylic rubber blends, consisting of (A) copolymers of 95–99.5 mol percent ethylacrylate and/or butylacrylate and 5–0.5 mol percent of acrylic or methacrylic acid, with (B) copolymers of styrene with acrylonitrile, said copolymer (A) being present in amounts of 5–50% by weight of the polymer blend, said process consisting in mixing together said acrylic copolymers (A) with said copolymers (B), at temperatures of from the glass transition temperature of the styrene/acrylonitrile copolymer and 220° C., in the presence of (C) from 0.05% to 2% by weight, on the weight of the polymeric mixture, of a compound selected from the group consisting of zinc chloride, cadmium chloride, ferric chloride, aluminum chloride and boron trifluoride, and (D) of an epoxy resin cross-linking agent having at least two oxirane groups per molecule.

2. Process according to claim 1, wherein zinc chloride is used in a quantity comprised between 0.1% and 1% by weight on the weight of the mixture of polymers.

* * * * *